United States Patent
Ziskind (10) Patent No.: US 11,492,071 B2
(45) Date of Patent: Nov. 8, 2022

(54) STEERABLE CRANK SYSTEM

(71) Applicant: Yosef Ziskind, Gadot (IL)

(72) Inventor: Yosef Ziskind, Gadot (IL)

(*) Notice: Subject to any disclaimer, the term of this patent is extended or adjusted under 35 U.S.C. 154(b) by 158 days.

(21) Appl. No.: 16/894,757

(22) Filed: Jun. 6, 2020

(65) Prior Publication Data
US 2020/0385085 A1    Dec. 10, 2020

Related U.S. Application Data

(60) Provisional application No. 62/859,425, filed on Jun. 10, 2019.

(51) Int. Cl.
| | |
|---|---|
| *B62M 1/14* | (2006.01) |
| *F16H 57/00* | (2012.01) |
| *B62M 3/14* | (2006.01) |
| *B62K 5/06* | (2006.01) |
| *B62M 6/10* | (2010.01) |
| *B62K 21/12* | (2006.01) |
| *F16D 3/10* | (2006.01) |
| *B62M 6/40* | (2010.01) |
| *B62M 1/12* | (2006.01) |
| *B62M 3/08* | (2006.01) |

(52) U.S. Cl.
CPC ............... *B62M 1/14* (2013.01); *B62K 5/06* (2013.01); *B62K 21/12* (2013.01); *B62M 3/14* (2013.01); *B62M 6/10* (2013.01); *B62M 6/40* (2013.01); *F16D 3/10* (2013.01); *F16H 57/0025* (2013.01); *B62M 1/12* (2013.01); *B62M 3/08* (2013.01)

(58) Field of Classification Search
CPC . B62M 1/14; B62M 3/14; B62M 6/10; B62M 6/40; B62M 1/12; B62M 3/08; B62M 1/36; B62M 3/00; B62K 5/06; B62K 21/12; B62K 5/05; B62K 5/08; B62K 21/18; F16D 3/10; F16H 57/0025
See application file for complete search history.

(56) References Cited

U.S. PATENT DOCUMENTS

| | | | |
|---|---|---|---|
| 6,264,224 B1* | 7/2001 | Phillips | B62M 23/00 |
| | | | 280/234 |
| 9,073,600 B2* | 7/2015 | Haan | B62M 1/12 |
| 10,220,910 B1* | 3/2019 | Barnett | B62M 1/12 |
| 2006/0226628 A1* | 10/2006 | Lindsay | B62K 21/00 |
| | | | 280/250 |
| 2007/0152421 A1* | 7/2007 | Pena | B62M 1/16 |
| | | | 280/232 |

(Continued)

*Primary Examiner* — Kevin Hurley
*Assistant Examiner* — Marlon A Arce (57) ABSTRACT

A Steerable Crank System including a Steerer Base firmly connected to the chassis/mainframe of a machine, said Steerer Base containing and supporting Grooved Cog Wheel situated in-line and parallel to the power driving direction in a manner that allows said Grooved Cog Wheel to rotate around its axis and drive the machine power, said Steerer Base containing and supporting a Fork in a manner that allows said Fork to rotate around its main axis and by that rotation movement it controls the steering, said Fork containing a $2^{nd}$ axis supporting and housing a Crank Shaft in a manner that allows said Crank Shaft to rotate around its own axis, on said Crank Shaft attached a Butterfly Connector, said Butterfly Connector coupling together said Crank Shaft and Grooved Cog Wheel.

12 Claims, 12 Drawing Sheets

(56) References Cited

U.S. PATENT DOCUMENTS

| | | | | |
|---|---|---|---|---|
| 2011/0241305 A1* | 10/2011 | Pi | ............................ | B62M 1/12 |
| | | | | 280/233 |
| 2015/0367909 A1* | 12/2015 | Haan | ........................ | B62M 1/12 |
| | | | | 280/234 |
| 2018/0215443 A1* | 8/2018 | Bricker | .................... | B62M 1/16 |
| 2021/0197922 A1* | 7/2021 | Durrani | .................... | B62M 9/00 |

* cited by examiner

SECTION1-1
Fig.7A

SECTION1-1
Fig.7B

SECTION1-1
Fig.7C

STEERABLE CRANK SYSTEM

CROSS-REFERENCE TO RELATED APPLICATIONS

The present application claims priority to provisional patent application No. 62/859,425 filed on Jun. 10, 2019, disclosures of which are incorporated herein at least by reference.

BACKGROUND OF THE INVENTION

1. Field of the Invention

The present invention is in the field of Human Powered Vehicles (HPVs) hand crank.

2. Description of Related Art

In Paraplegic Trike or Hand Cycle, the industry existing solutions typically rely on the hand crank transferring the power via cog wheel and chain, to the front-wheel, and thus allowing the power transfer chain to be simplified and remain in line with both the driving and driven cog wheels, further allowing this complete assembly to be included in the front wheel steering assembly. However, by this method it is not possible to transfer the power to the rear-wheels due to system limitations.

In most Human Powered Vehicles (bicycle, recumbent tricycles, etc.) it is very advantageous to direct the driving power to the rear-wheel(s), as this affords better vehicle traction (especially uphill), and thus better overall performance.

A rear drive hand cycle typically will have a hand-crank power transfer system that consists of a mechanical hand crack structure that is permanently and strongly connected to the mainframe/chassis of the vehicle. Within this said mechanical hand crank structure will reside a central shaft, centered and load supported by 1 or more bearings, with 2 crank handles on the extremities of the shaft. On the shaft is rigidly mounted a cog wheel (or similar element), on which is mounted a chain (or similar element) that transmits the power onwards towards the ratio-gear, and the driving wheel (or wheels). In said 'Trike' the existing Steering System is constructed such that it is separated and is thus separately operated from the Hand Crank (power system).

As a consequence of this separation of systems, whenever the user/rider needs to steer the vehicle it is essential to move his hands away from the Hand Crank, thus losing power, and vice versa, whenever the hands are cranking the power system to provide force to the wheels, the consequence is that the control and safety of the steering (and in some models the brake handles too) is impeded or severely under-performing.

Also, whenever the vehicle is traversing uphill slopes in ragged terrain, when the hands are off the hand crank the vehicle tends to stall movement altogether and stop, rendering continued motion of the vehicle extremely difficult.

There are a few existing models of hand cranks that allow a minimal steering movement deriving from the flexibility of the chain. These models enable to steer and crank simultaneously. However, a twisted chain tends to go off the cogwheel because the cogwheel is no longer in-line and parallel to the power driving direction. For that reason, the crank steering-angle is restricted to a relatively small angle. Thus, in order to achieve sufficient steering-angle at the vehicle wheel, a change in the ratio of the steering-angle is required. This is done by having a long leverage at the crank, connected by a pushrod to a short leverage at the vehicle wheel. The smaller steering-angle of the crank is thus transformed to a larger steering-angle at the vehicle wheel. This described existing solution to the problem is the cause of two main drawbacks:

1. Fine steering is difficult to achieve due to disadvantageous transformation ratio of the action, and the diminished sensitivity and precision it entails
2. The vehicle's course tends to unintentionally zigzag along, due to the fact that in the described existing system, every small diversion movement of the crank imposes a much larger steering movement at the steering vehicle wheel Therefore, what is clearly needed is a steerable crank that solves the problems mentioned above.

BRIEF SUMMARY OF THE INVENTION

In an embodiment of the invention a Steerable Crank System is provided, comprising a Steerer Base firmly connected to the chassis/mainframe of a machine, said Steerer Base containing and supporting Grooved Cog Wheel situated in-line and parallel to the power driving direction in a manner that allows said Grooved Cog Wheel to rotate around its axis and drive the machine power. said Steerer Base containing and supporting a Fork in a manner that allows said Fork to rotate around its main axis and by that rotation movement, controls the steering. said Fork containing a $2^{nd}$ axis supporting and housing a Crank Shaft in a manner that allows said Crank Shaft to rotate around its own axis. On said Crank Shaft attached a Butterfly Connector, said Butterfly Connector coupling together said Crank Shaft and Grooved Cog Wheel.

This system enables simultaneous propulsion and steering of a machine by operating the Crank Shaft only. The Crank Shaft effectively acts as a power delivery and steering mechanism combined.

In the field of Human Powered Vehicles (HPVs) and particularly at the off-road hand cycle field, this system overcomes significant drawbacks of existing art and provides reliable and effective solution for transferring the power to the rear-wheels, and simultaneous steering, thus rendering the system much safer to use.

DETAILED DESCRIPTION OF THE INVENTION

The inventor provides a Steerable Crank System that enables simultaneous propulsion and steering of a machine by operating the Crank Shaft only. The Crank Shaft effectively acts as a power delivery and steering mechanism combined.

The present invention is described in enabling detail in the following examples, which may represent more than one embodiment of the present invention.

Figure 1:
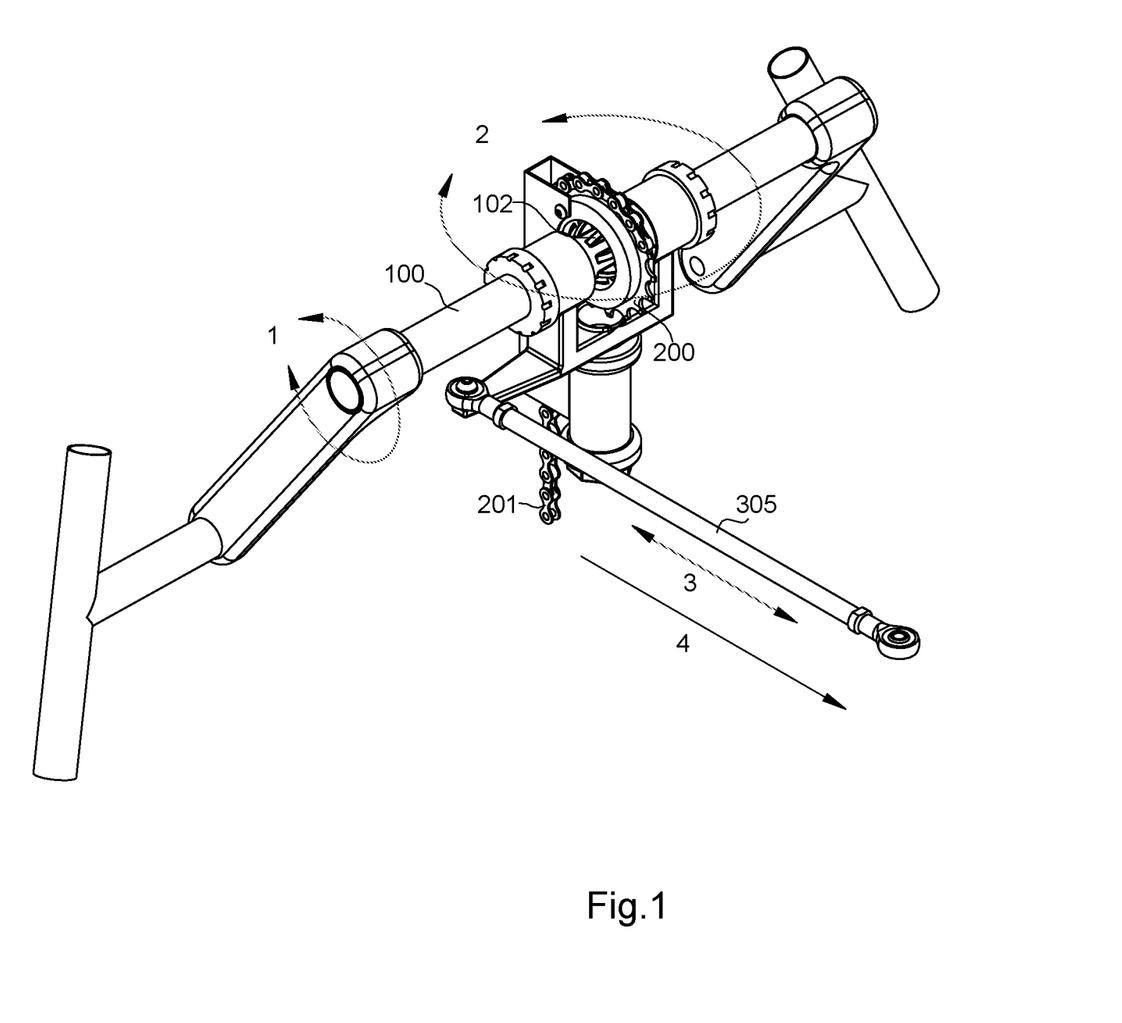
FIG. 1 is a general overview of a Steerable Crank System, including the degrees of freedom and function of each motion, and a general description of parts according to an embodiment of the present invention.

FIG. 1 is an isometric view of a Steerable Crank System according to an embodiment of the present invention.

Figure 6A:
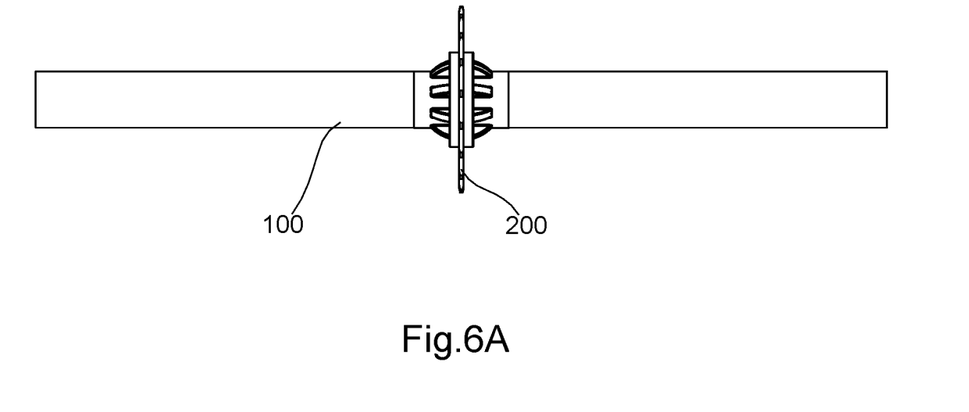
FIG. 6A, FIG. 6B, FIG. 6C and FIG. 6D are a general overview of the principals and details of a coupling mechanism of the main components, namely 'Crank Shaft', 'Cog Wheel' and 'Butterfly Connector', according to embodiment of the present invention.
Figure 12A:
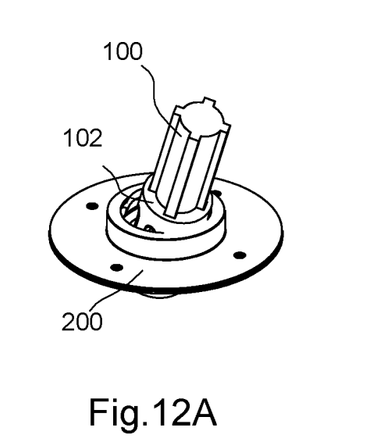
FIG. 12A, FIG. 12B and FIG. 12C describes further details of a coupling mechanism, with different embodiments and variations, according to different embodiments of the present invention.

Crank Shaft 100 is in this example a Crank Shaft that propels the power from the power source (in this case human manual power) and connected firmly to element number 102 Butterfly Connector. Part 102 in this example a Butterfly Connector which will be described in more detail at FIG. 6 to FIG. 12.

Part number 200 is in this example a Grooved Cog Wheel that transfers the torque provided from the Crank Shaft via the Butterfly Connector 102, to a chain in this example 201 (represented in this drawing by a short chain segment only) to the vehicle driving wheels.

Arrow (1) is indicating the rotation direction of the Crank Shaft to deliver power to the vehicle.

Arrow (2) is indicating the divergence movement of the Crank Shaft 100 axis, while situated and centrally located through the Grooved Cog Wheel 200, to enable the Crank Shaft 100 to steer the vehicle to the left and right.

Arrow (3) is indicating the linear movement of a pushrod mechanism 305 as a consequence of the movement indicated by arrow (2). Part 305 in this example is a pushrod that transfers the linear movement to the steering column of the front-wheel(s) of the vehicle (not shown).

A general forward direction of the vehicle is also indicated by arrow (4).

Figure 2:
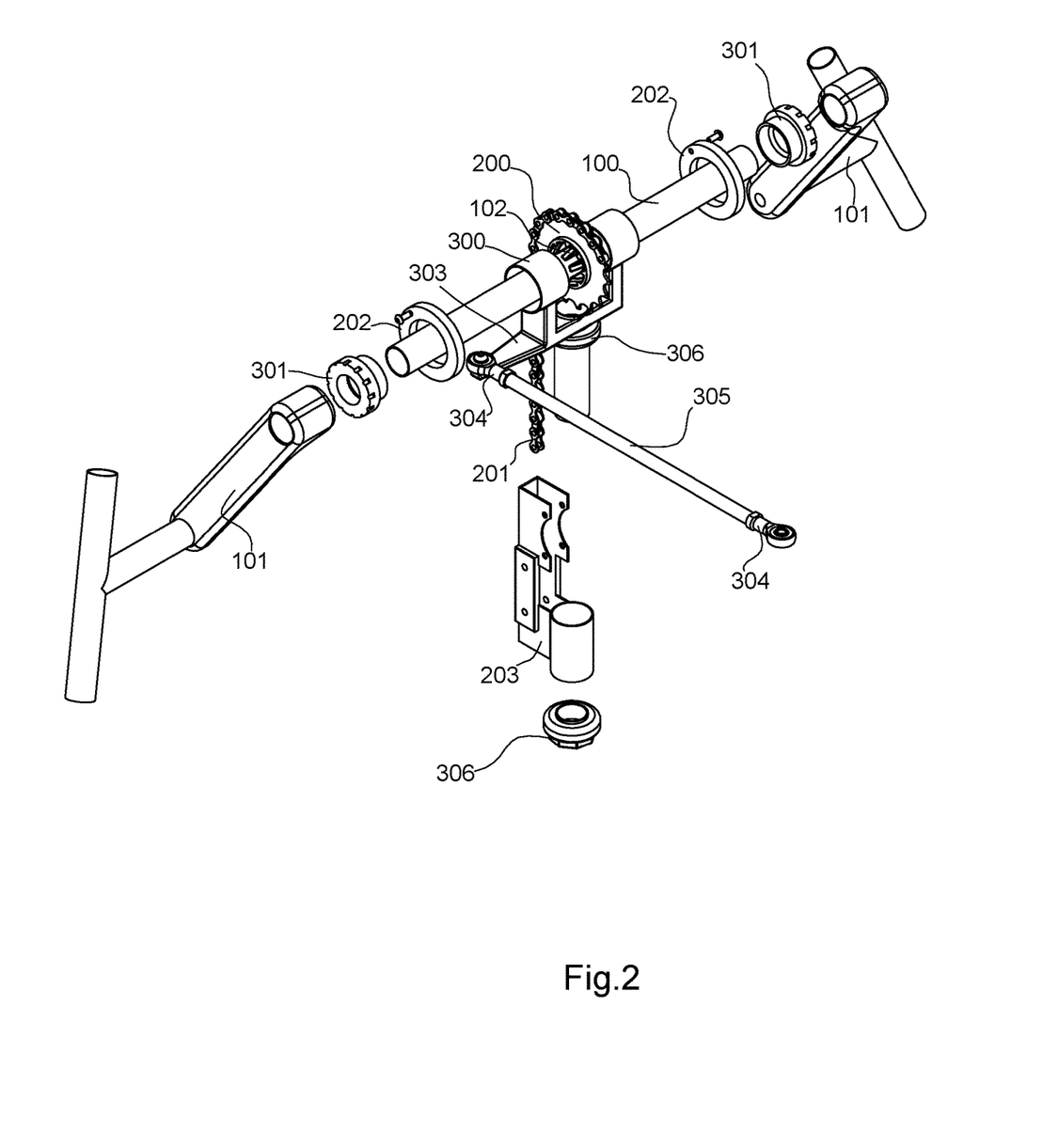
FIG. 2 is an exploded view of the Steerable Crank System of FIG. 1 with detailed description of the parts thereof.

FIG. 2 is a partial exploded view of FIG. 1 according to an embodiment of the present invention. This embodiment includes components that were previously introduced in FIG. 1. Those components previously introduced that have not changed in this example retain their original element numbers and are not reintroduced. It also contained a description of the parts and functionality of an example of a Steerable Crank System, according to an embodiment of the present invention.

Grooved Cog Wheel 200 located and fixed by parts 202. Part 202 in this example is a Cog Wheel Bushing. Cog Wheel Bushing 202 is connected via parts 203 to the chassis/mainframe of the vehicle. Part 203 in this example is a Steerer Base. The Steerer Base 203 is connected firmly to the vehicle chassis/mainframe. Grooved Cog Wheel 200 is effectively held in place and located by the Steerer Base 203 and Cog Wheel Bushings 202 to the chassis/mainframe in-line and parallel to the driving direction in a manner that allows it to rotate around its axis while transferring power to the driving wheels by way of a chain 201 (represented in this drawing by a short chain segment only).

Crank Shaft 100 held in place by parts 301. Part 301 in this example is a Shaft Bearing. Crank Shaft 100 can rotate around its axis and deliver a torque by part 102 Butterfly Connector, to Grooved Cog Wheel 200. The torque can be delivered even when the axis of Grooved Cog Wheel 200 is not in-line with the axis of Crank Shaft 100. Butterfly Connector 102, positively coupling the Crank Shaft 100 to Grooved Cog Wheel 200, while enabling the axis of the two parts 100 and 200 to diverge in angle upon need. Cog Wheel Bushings 202—may be ball bearings or bushings, it can be made of plastic inserts or phosphor bronze inserts or likewise low friction high strength materials. Its function is to support Grooved Cog Wheel 200 and allow it to rotate around its axis. Shaft bearing 301—holds the Crank Shaft 100 in place and allows it to rotate around its axis with minimal friction. It can be a standard BB bicycle bearing or likewise parts with left and right threads. It can contain a fixing element to prevent the Crank Shaft from moving along its axis.

Part 101 in this example is a handle and arm—the rider is grabbing the handles and rotating these arms to create a torque at the Crank Shaft and drive the vehicle, the rider can also simultaneously steer the vehicle, using the same handles and arms. A standard 175 mm crank arm or likewise can be used.

Part 306 in this example is a Headset Bearing—can be a conventional 1" Headset or likewise. It enables the Fork 300 to move both in a clockwise and anti-clockwise direction. Part 300 in this example is a Fork—the Fork has 2 axis: Fork main axis and Fork $2^{nd}$ axis. The Fork is holding the Crank Shaft 100 by means of the shaft bearings 301 at its $2^{nd}$ axis. The Fork rotates clockwise and anti-clockwise by means of the Headset Bearing 306 at its main axis and thus steers the vehicle by means of the Steerer Actuator Element 303, in this example a rod end 304 and pushrod 305. Part 304 in this example is a standard rod end. The Steerer Actuator Element 303 in this example is an integral part with the Fork 300 and they are fully connected.

Figure 3A:
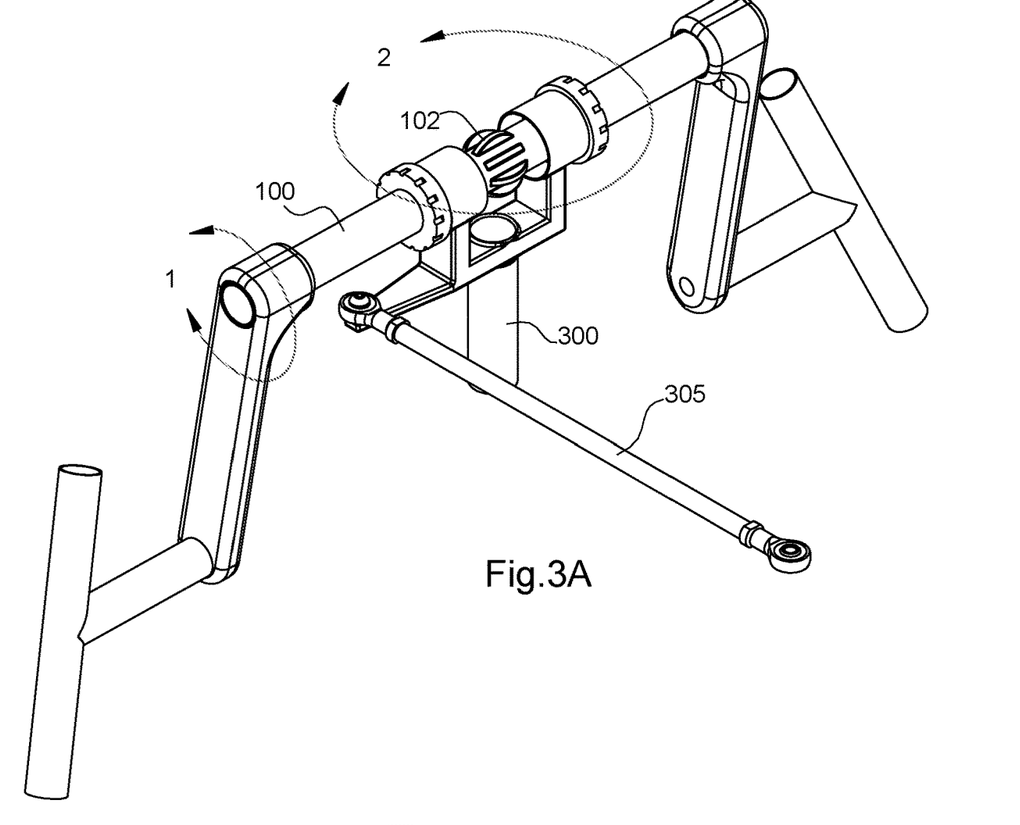
FIG. 3A and FIG. 3B describe a Steerable Crank System with emphasis on the mechanical connection and degrees of freedom of the main 2 sub-assemblies—steering and cranking, according to an embodiment of the present invention.
Figure 3B:
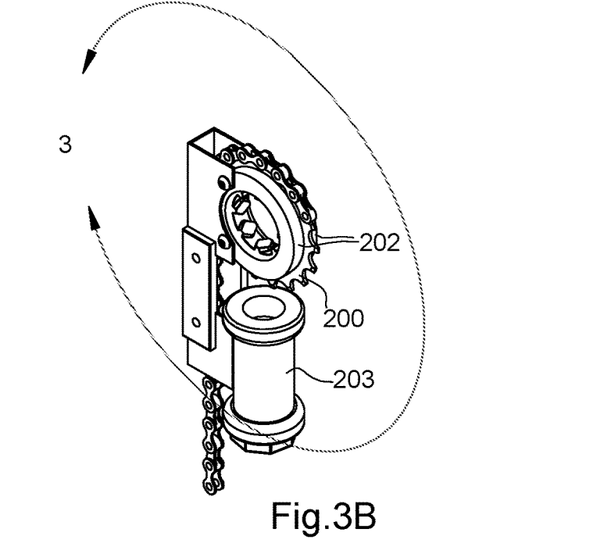

FIG. 3A and FIG. 3B are illustrations describing the Steerable Crank System as the same examples of embodiments as FIG. 1 and FIG. 2, with emphasis of the mechanical connection and degrees of freedom of the main 2 sub-assemblies—namely, steering and cranking (power) assemblies. This embodiment includes components that were previously introduced in FIG. 1 and FIG. 2, Those components previously introduced that have not changed in this example retain their original element numbers and are not reintroduced:

FIG. 3A includes the hand crank assembly, Crank Shaft 100, Butterfly Connector 102, Fork 300, pushrod 305, etc. The function of this assembly is to allow simultaneous cranking (to provide power, movement emphasized by arrow 1), and steering control movement (emphasized by arrow 2), in a unified system, all functions are operated by the hands simultaneously.

Fork 300 is comprising of 2 axis: Fork main axis and Fork $2^{nd}$ axis. The Fork is holding the Crank Shaft 100 at its $2^{nd}$ axis and allow movement emphasized by arrow (1) that drives the vehicle. The Fork rotates clockwise and anti-clockwise at its main axis—a movement emphasized by arrow (2) and thus steers the vehicle.

FIG. 3B includes the Grooved Cog Wheel 200, Steerer Base 203, etc. All the parts at this assembly are firmly connected to the chassis/mainframe of the vehicle except the Grooved Cog Wheel 200 that connected via Cog Wheel Bushings 202 and can rotate as shown by arrow (3). The function of this assembly is to allow an efficient and reliable transferal of power to and from the Grooved Cog Wheel, held steady and rigidly to the chassis, adding stability and precision to the complete Steerable Crank System.

Figure 4A:
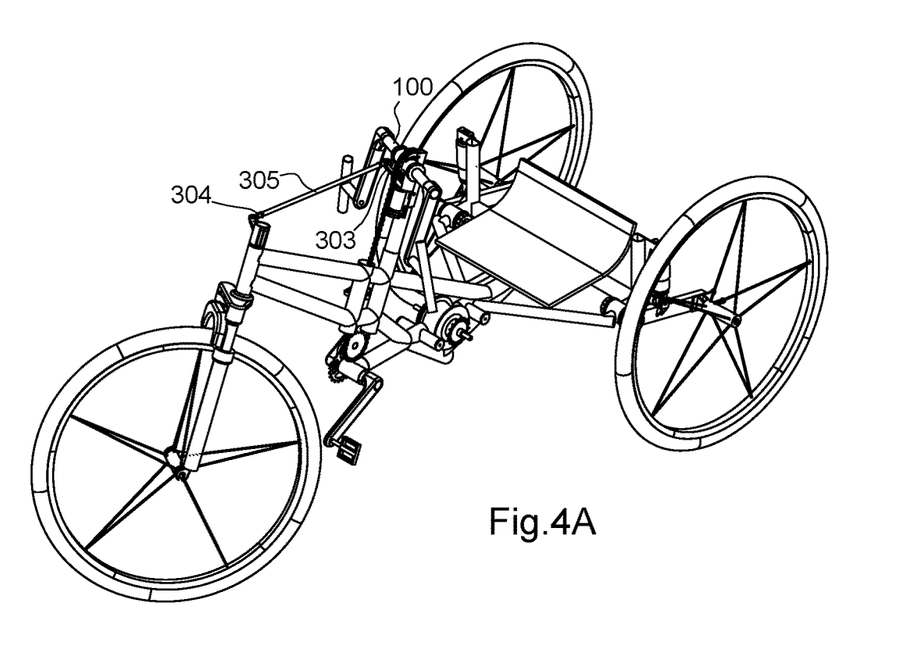
FIG. 4A describes one possible implementation of a Steerable Crank System in a hands and legs driven off-road Trike, with general details, according to another embodiment of the present invention.

FIG. 4A Shows an example of a novel hands and legs operated off road trike. The Steerable Crank System (i.e. the claimed invention) is incorporated in this vehicle as an example of the embodiment of FIG. 1 and FIG. 2, This embodiment includes components that were previously introduced in FIG. 1 and FIG. 2, Those components previously introduced that have not changed in this example retain their original element numbers and are not reintroduced. This mechanism enables this vehicle to be a rear drive vehicle, which has a fundamental positive influence on the vehicle off road capabilities, improving the traction and optimizing the weight distribution, safety and control. The riders' hands movement is rotating the Crank Shaft 100 which transmit the power to a transmission gear (not specified) that combines both the hands and legs power sources, and further transfers the power on to the transmission gear (not specified) and on to the rear axle (not specified) and on to the rear driving wheels.

By means of incorporation of this invention, all above mentioned functions can reside while simultaneously providing the ability to move the Crank Shaft 100 (that is effectively functioning also as a steering handle bar) in a clockwise or anti-clockwise directions in order to steer the vehicle by means of the Steerer Actuator Element 303, steerer pushrod 305 and rod end 304 farther on to the front wheel steerer.

When the rider desires to turn right, the pushrod 305 is moving backwards and steers the front-wheel to the right, like shown.

When the rider desires to turn left, the pushrod 305 is moving forwards and steers the front-wheel to the left.

Power cranking can be provided simultaneously and at all times and steering angles.

Figure 4B:
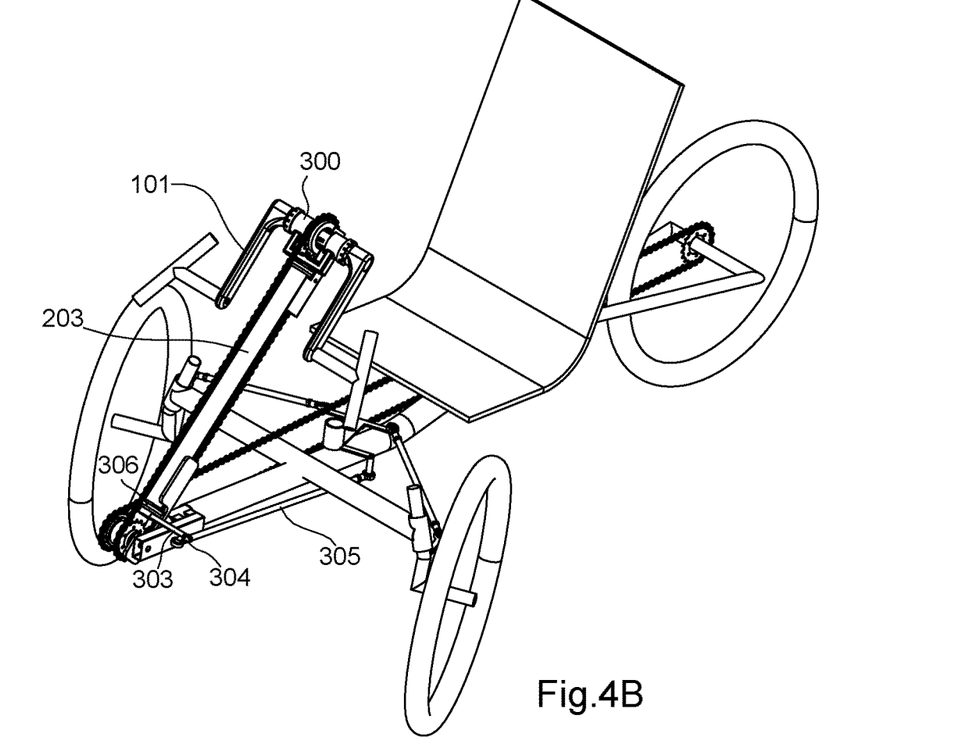
FIG. 4B describes yet another possible implementation of a Steerable Crank System application in a hand driven off-road Recumbent Trike, with general details, according to another embodiment of the present invention.

FIG. 4B Shows an example of a hands driven off-road Recumbent Trike. The recumbent is a 'two front wheels and one rear wheel' configuration.

The Steerable Crank System (i.e. the claimed invention) is incorporated in this vehicle as an example of almost the same embodiment as of FIG. 1 and FIG. 2, This embodiment includes components that were previously introduced in FIG. 1 and FIG. 2, Those components previously introduced that have not changed in this example retain their original element numbers and are not reintroduced.

In this example the Steerer Base 203 and the Fork 300 main axis are much longer then in the embodiment described at FIG. 1 and FIG. 2. In the current embodiment the Steerer Actuator Element 303 is a separate part that can be attached at the bottom end of the Fork 300 underneath Headset Bearings 306 to be permanently connected (as is shown in FIG. 13C). This mechanism enables the vehicle to be a hand driven, rear drive vehicle, which has a fundamental positive influence on the vehicle off road capabilities, improving the traction and optimizing the weight distribution, safety and control. The riders' hands rotate the crank handle and arm 101, which in turn rotate the Crank Shaft (not specified) which transmits the power to a transmission gear (not specified) and on, to the rear driving wheel.

By means of incorporation of this invention, all above mentioned functions can reside while simultaneously providing the ability to move the hand crank that is effectively functioning also as a steering handle bar, in a clockwise and anti-clockwise directions in order to steer the vehicle by means of the Steerer Actuator Element 303, steerer pushrod 305 and rod end 304, and on to the front wheels steerer elements.

When the rider desires to turn right, the pushrod is moving forwards and steers the front-wheels to the right.

When the rider desires to turn left, the pushrod is moving backwards and steers the front-wheels to the left, like shown.

Power cranking can be provided simultaneously to steering, and at all times and steering angles.

Figure 5:
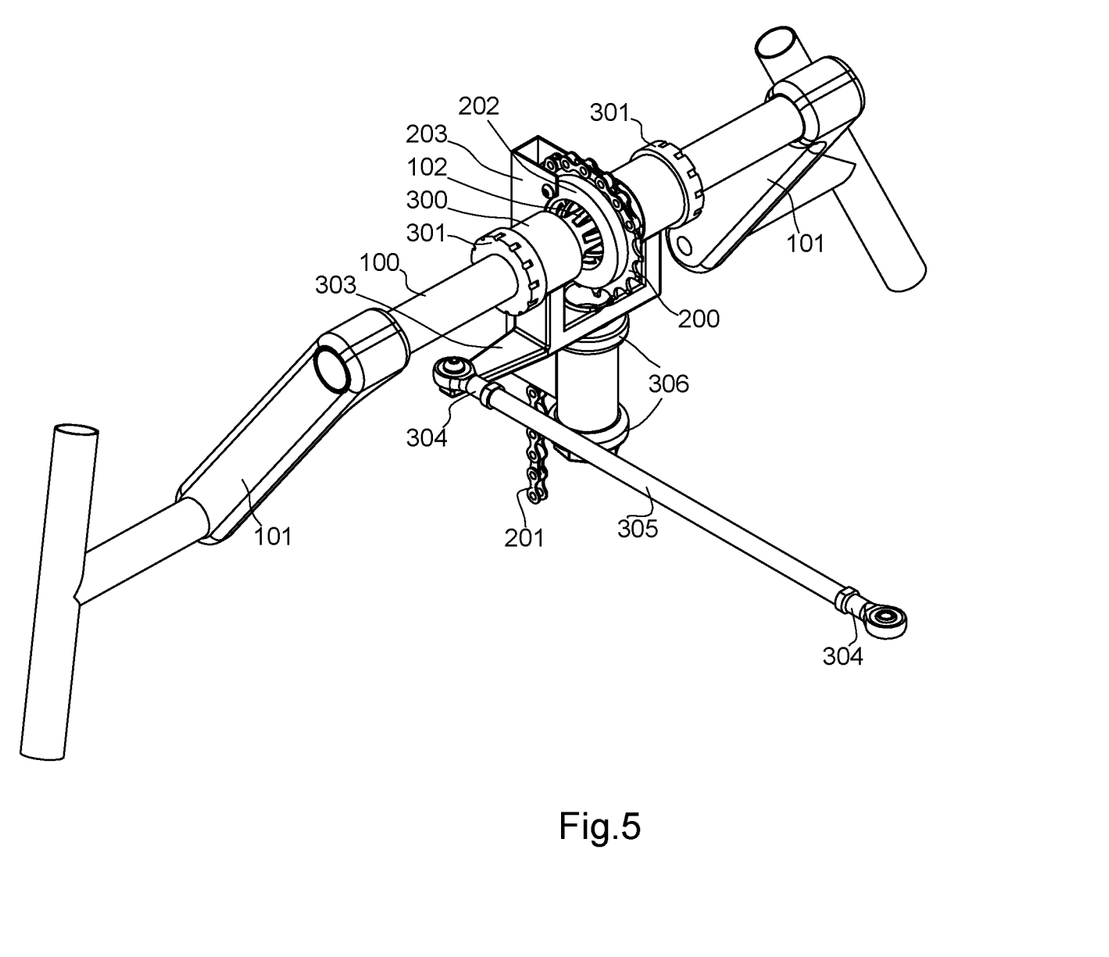
FIG. 5 is a general overview of a Steerable Crank System, with detailed description of a system parts according to an embodiment of the present invention.

FIG. 5 is a drawing describing in detail the Steerable Crank System as an example of the embodiment of FIG. 1 and FIG. 2, This embodiment includes components that were previously introduced in FIG. 1 and FIG. 2, Those components previously introduced that have not changed in this example retain their original element numbers and are not reintroduced:

A 'Steerable Crank System' is comprising of a Crank Shaft 100 with two handles and arms 101 on extremities, and a centrally positioned fixed or movable projecting element 102 Butterfly Connector, the said Crank Shaft 100 is assembled with two ball bearings 301 or similar elements designed to center and reduce friction to the Fork 300, the said Crank Shaft 100 is also axially located and fixed to said Fork 300 by means of a locking element such as screw by ball bearings 301 or with a shaft collar (not represented) or similar element, and of a Grooved Cog Wheel 200, specifically designed such that it is in continuous and optimal coupling with the said Butterfly Connector 102, on said Grooved Cog Wheel 200 is mounted a chain 201 (represented in this drawing by a short chain segment only) that transfers the power onwards to the gear and driving wheel(s) of the vehicle (not represented), said Grooved Cog Wheel 200 is assembled with Cog Wheel Bushing 202 or similar elements designed to center and reduce friction to the Steerer Base 203, said Steerer Base 203 containing and supporting said Grooved Cog Wheel 200, said Steerer Base 203 rigidly connected to the vehicle chassis/mainframe (not represented), said Fork 300 supporting the said Crank Shaft in place, while allowing axial rotation of said Crank Shaft 100 within the Fork 300, said Fork 300 having a stem structure situated and assembled with Headset Bearings 306 or similar elements designed to center and reduce friction, within a Steerer Base 203. A Steerer Actuator Element 303 is attached to the Fork 300 and provides an off-center leverage point connected by a rod end 304 and the pushrod 305 to the steering assembly connected to the vehicle wheel (not represented). It is pointed out that the Grooved Cog Wheel 200 and the Butterfly Connector 102 nature of coupling is designed such, that it simultaneously affords and allows a high precision angular-axial freedom of movement, AND un-interrupted torque delivery from Crank Shaft 100 and Butterfly Connector 102 to the Grooved Cog Wheel 200, at all times, even when the Crank Shaft axis is not in-line with the Grooved Cog Wheel 200 axis.

FIG. 6A, FIG. 6B, FIG. 6C and FIG. 6D describe-in some detail the principals and fundamentals of the invention, according to an embodiment of the present invention. This embodiment includes components that were previously introduced in FIG. 1 and FIG. 2, Those components previously introduced that have not changed in this example retain their original element numbers and are not reintroduced.

FIG. 6A describes the core parts of the system, in a normally aligned position. In some embodiments, for example in the case of a off-road hand cycle HPV as previously referenced, this normally aligned position may represent the steering position 'ZERO', i.e. steering straight ahead.
In this position the rotational main axes of both the Crank Shaft 100 AND the Cog Wheel are fully incident and in-line with each other.

Figure 6B:
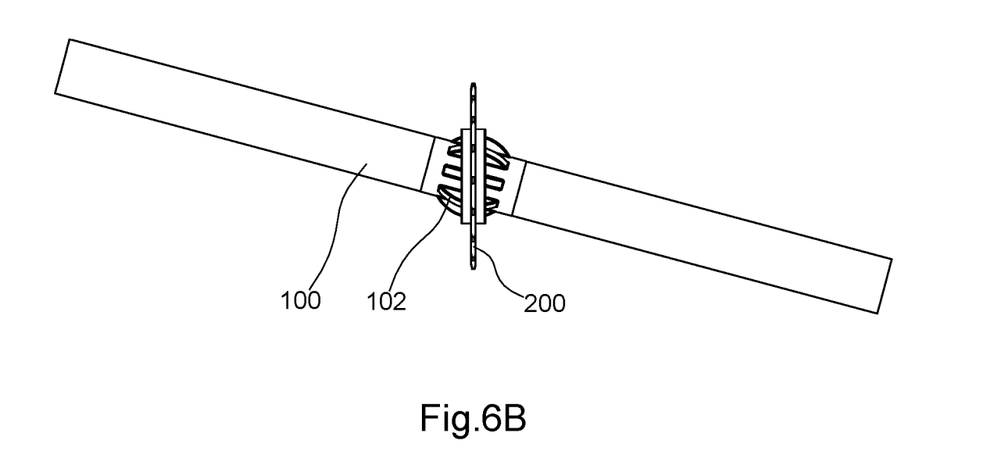

FIG. 6B describes and details the coupling mechanism of the main components, namely Grooved Cog Wheel 200 to Butterfly Connector 102 to Crank Shaft 100. In FIG. 6B the Crank Shaft 100 is connected firmly to the Butterfly Connector 102 and can rotate within the Grooved Cog Wheel 200 such that the Crank Shaft 100 Main Axis diverges from incidence from the rotational main axis of Grooved Cog Wheel 200. In some embodiments, for example as in the case of said off-road hand cycle HPV as previously referenced, this tilted position may represent the steering position 'Right', i.e. steering the vehicle to the right.

Figure 6C:
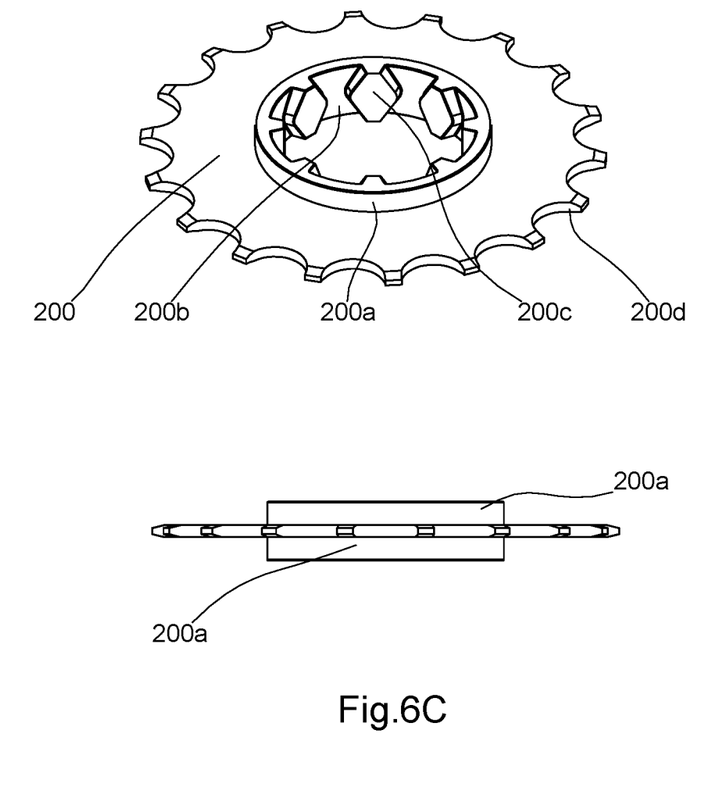

FIG. 6C describes in detail the Grooved Cog Wheel 200 and important working surfaces and structures thereof.
Shoulder structure (200a) supports the Grooved Cog Wheel 200, locating it in place by means of a bushing and/or a bearing (not represented), allowing it to rotate around the Grooved Cog Wheel's rotational axis.
Surface (200b) comes in contact with corresponding surface in the Butterfly Connector Wing/Tooth (not represented). This area (200b) essentially acts as a groove that contains said Butterfly Connector Wing/Tooth, allowing the said Wing/Tooth to have a localized rotational, yet limited, freedom of movement. This specific freedom of movement is fundamental to the invention and allows the main rotational axes of the Crank Shaft and the Grooved Cog Wheel 200 to diverge when needed.
Structure (200c) essentially acts as an internal Cog/Tooth. Structure (200c) main purpose is to carry the torque/load and transfer it between the Crank Shaft/Butterfly Connector/ Grooved Cog Wheel, and vice versa.
It should be noted that in the case described in FIG. 6C the Cog/Tooth (200c) has a trapezoidal section geometry, but other geometries are also claimed.
Structure (200d) in this example is a group of teeth on the circumference of the Grooved Cog Wheel 200, adapted to receive (as depicted in this embodiment) a typical bicycle chain.

Figure 6D:
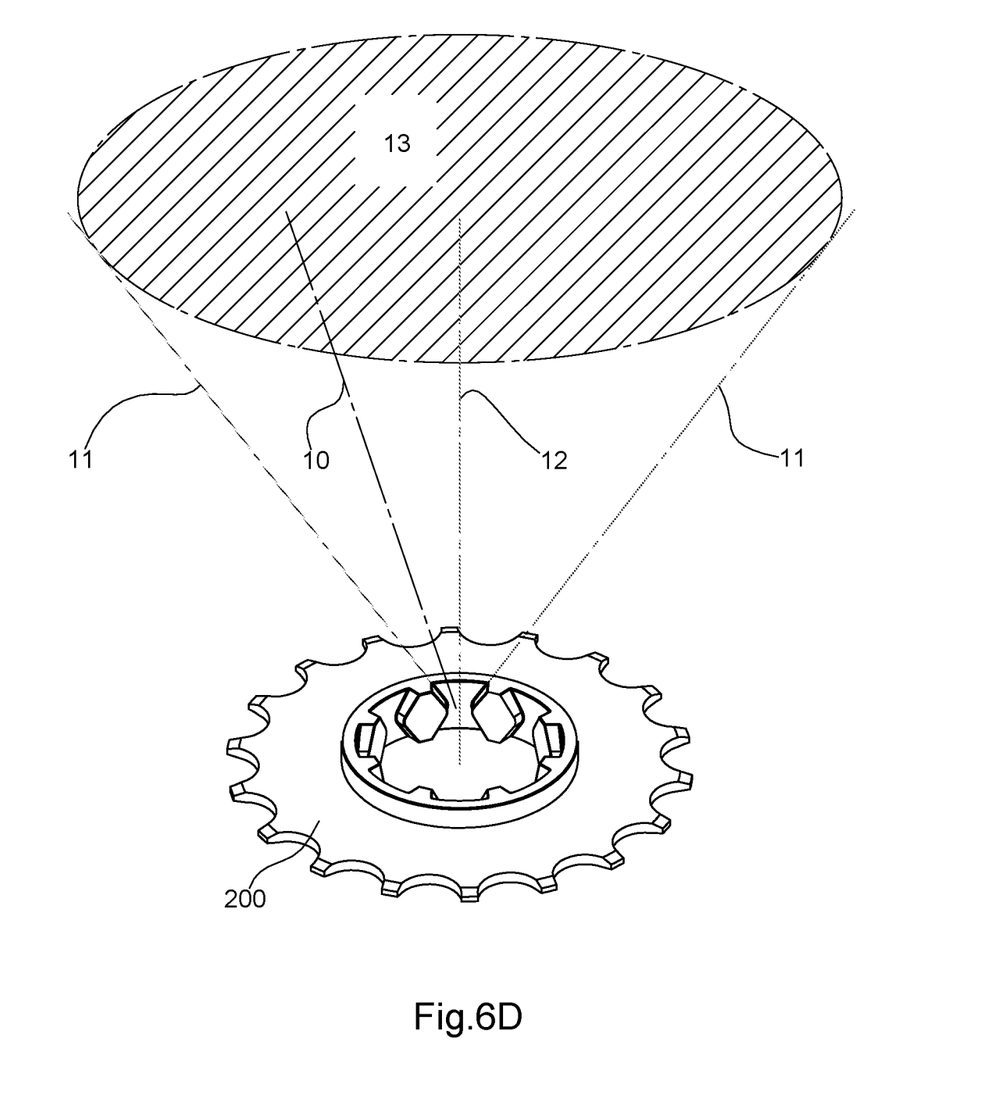

FIG. 6D describes in a purely geometrical form, the possible effective interaction between Crank Shaft and Grooved Cog Wheel 200 Main rotational axes, in relation to each other.
Line 12 represents the main rotational axis of the Grooved Cog Wheel 200, in a specific case, i.e. location 'ZERO', a neutral location as previously described in FIG. 6A. Line 12 should also be regarded as representative of the rotational main axis of the Crank Shaft. In this specific case the divergence can be regarded as 'ZERO'.
Line 11 represents the extreme divergence location of Crank Shaft main rotational axis, in relation to the main rotational axis of Grooved Cog Wheel 200. The respective relations between axis 11 and axis 12 represent a field of all possible locations/positions depicted as an ellipse 13. Those may be described by a cone (or conical couple), where perimeter of cone (or cone perpendicular section i.e. a circle) represents a border that includes all possible locations of axis 10. In the described, the extreme location of axis may be regarded as divergence 'MAX'.
Line 10 represents any and all axis locations of divergence, between 'ZERO' and 'MAX'.

Figure 7A:
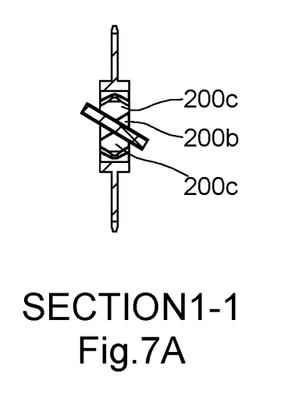
FIG. 7A, FIG. 7B and FIG. 7C Describes the different positions of a single Butterfly Connector Wing/Tooth, as it is located in a groove of the Grooved Cog Wheel, according to embodiment of the present invention.
Figure 7B:
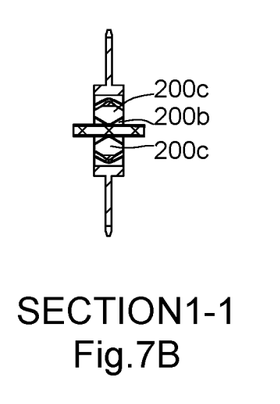
Figure 7C:
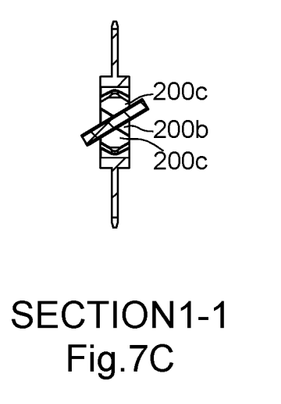

FIG. 7A, FIG. 7B and FIG. 7C Describes the different positions of a single Butterfly Connector 102 Wing/Tooth, as it is located in Grooved Cog Wheel 200 groove (200b) in-between 2 internal Cog/Tooth (200c) as previously described in FIG. 6C.
At the section views 1-1 the Wing/Tooth is described in various positions.
It is shown that the contact surfaces between parts continue to provide support and torque transfer at all possible aspect angles of Wing/Tooth relative to groove (200b).

FIG. 7A section view 1-1 describes extreme positions, i.e. location of a single represented Wing/Tooth when at this example steering left.

FIG. 7B section view 1-1 describes a central, neutral (i.e. 'ZERO') position, where main axes of all parts are incident and in-line, as previously described in FIG. 6A.

FIG. 7C section view 1-1 describes extreme positions, i.e. location of a single represented Wing/Tooth when at this example steering right.

Figure 8A:
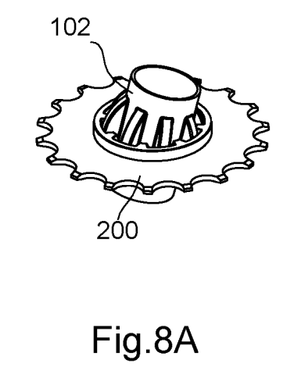
FIG. 8A, FIG. 8B and FIG. 8C describes further details of a coupling mechanism, with different embodiments and variations, according to different embodiments of the present invention.
Figure 8B:
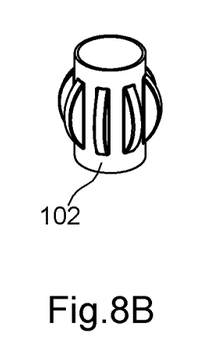
Figure 8C:
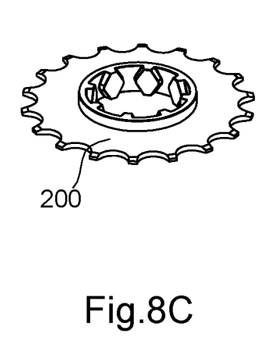

FIG. 8A, FIG. 8B and FIG. 8C describes further details of a coupling mechanism, with different embodiments and variations, according to different embodiments of the present invention, these embodiments should be regarded as examples only and should not limit the scope of the claimed invention.

FIG. 8A describes a Butterfly Connector/Grooved Cog Wheel assembly, whereas the butterfly connector 102 has 8 Wings/Teeth and Grooved Cog Wheel 200 has 8 corresponding grooves, of a trapezoidal section.

FIG. 8B describes a Butterfly Connector 102 that has 8 Wings/Teeth.

FIG. 8C describes a Grooved Cog Wheel 200 that has 8 grooves of trapezoidal section.

Figure 9A:
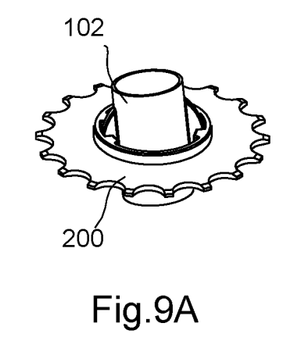
FIG. 9A, FIG. 9B and FIG. 9C describes further details of a coupling mechanism, with different embodiments and variations, according to different embodiments of the present invention.
Figure 9B:
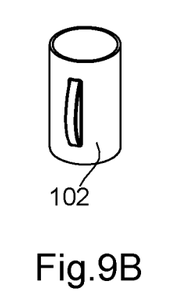
Figure 9C:
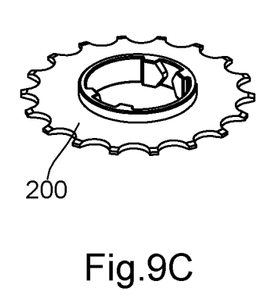

FIG. 9A, FIG. 9B and FIG. 9C describes further details of a coupling mechanism, with different embodiments and variations, according to different embodiments of the present invention, these embodiments should be regarded as examples only and should not limit the scope of the claimed invention.

FIG. 9A describes a Butterfly Connector/Grooved Cog Wheel assembly, whereas the butterfly connector 102 has 2 Wings/Teeth and Grooved Cog Wheel 200 has 2 corresponding grooves, of a semi-trapezoidal section.

FIG. 9B describes a Butterfly Connector 102 that has 2 Wings/Teeth.

FIG. 9C describes a Grooved Cog Wheel 200 that has 2 grooves of semi-trapezoidal section.

Figure 10A:
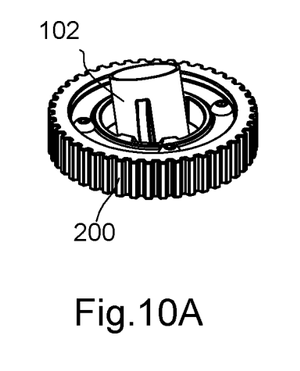
FIG. 10A, FIG. 10B and FIG. 10C describes further details of a coupling mechanism, with different embodiments and variations, according to different embodiments of the present invention.
Figure 10B:
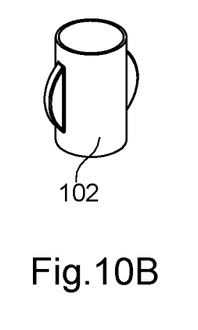
Figure 10C:
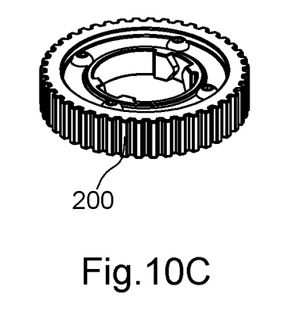

FIG. 10A, FIG. 10B and FIG. 10C describes further details of a coupling mechanism, with different embodiments and variations, according to different embodiments of the present invention, these embodiments should be regarded as examples only and should not limit the scope of the claimed invention.

FIG. 10A describes a Butterfly Connector/Grooved Cog Wheel assembly, whereas the butterfly connector 102 has 2 Wings/Teeth and Grooved Cog Wheel 200 has 2 corresponding grooves, of a semi-trapezoidal section and is adapted for a timing belt.

FIG. 10B describes a Butterfly Connector 102 that has 2 Wings/Teeth.

FIG. 10C describes a Grooved Cog Wheel 200 that has 2 grooves of semi-trapezoidal section and is adapted for a timing belt.

Figure 11A:
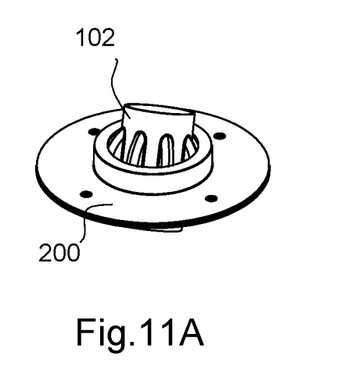
FIG. 11A, FIG. 11B and FIG. 11C describes further details of a coupling mechanism, with different embodiments and variations, according to different embodiments of the present invention.
Figure 11B:
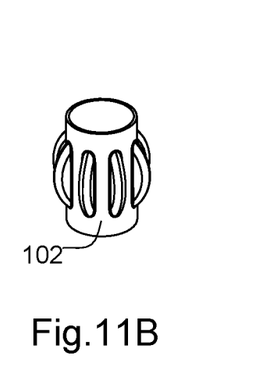
Figure 11C:
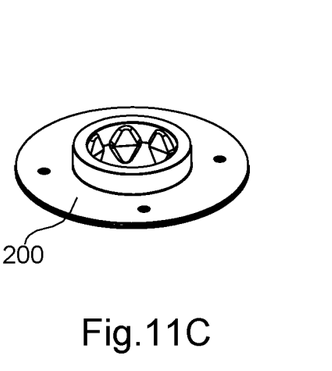

FIG. 11A, FIG. 11B and FIG. 11C describes further details of a coupling mechanism, with different embodiments and variations, according to different embodiments of the present invention, these embodiments should be regarded as examples only and should not limit the scope of the claimed invention.

FIG. 11A describes a Butterfly Connector/Grooved Cog Wheel assembly, whereas the Butterfly Connector 102 has 8 rounded Wings/Teeth and Grooved Cog Wheel 200 has 8 corresponding grooves, of a rounded-trapezoidal section. The Grooved Cog Wheel 200 is consisting of 2 halves, and has an internal spheroidal space that is designed such that when the two halves of the Grooved Cog Wheel 200 are assembled around the Butterfly Connector 102, the Butterfly Connector 102 is effectively located and caged inside the Grooved Cog Wheel 200 in a similar way of that of a ball-joint.

FIG. 11B describes a Butterfly Connector 102 that has 8 rounded Wings/Teeth.

FIG. 11C describes a Grooved Cog Wheel 200 that has 8 grooves of a rounded-trapezoidal section. The Grooved Cog Wheel 200 is consisting of 2 halves and has an internal spheroidal space. The outer ring of the Grooved Cog Wheel 200 can accept any type of cog or timing belt etc.

Figure 12B:
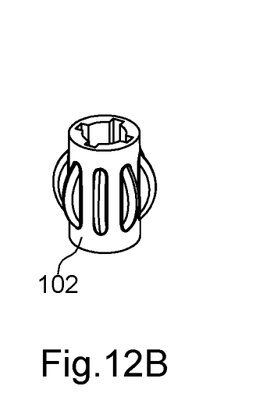
Figure 12C:
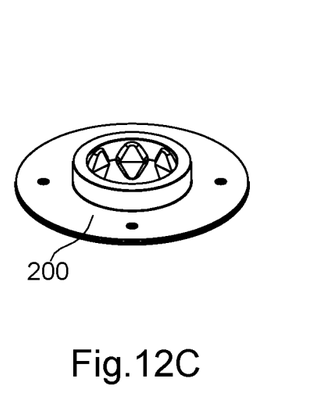

FIG. 12A, FIG. 12B and FIG. 12C describes further details of a coupling mechanism, with different embodiments and variations, according to different embodiments of the present invention, these embodiments should be regarded as examples only and should not limit the scope of the claimed invention.

FIG. 12A describes a Butterfly Connector/Grooved Cog Wheel assembly, whereas the Butterfly Connector 102 has 8 rounded Wings/Teeth, It has inner 4 grooves and allows additional internal, smaller diameter spline Crank Shaft 100, to move within the said Butterfly Connector 102 in an axial direction, thus effectively adding a 3rd dimensional freedom of movement. Grooved Cog Wheel 200 is similar to the embodiment shown at FIG. 11C FIG. 12B describes a Butterfly Connector 102 that has 8 rounded Wings/Teeth, it has inner 4 grooves and allows additional internal, smaller diameter spline Crank Shaft, to move within the said Butterfly Connector 102 in an axial direction, thus effectively adding a 3rd dimensional freedom of movement. This type of Butterfly Connector 102 is also referring as Shaft/Bushing configuration.

FIG. 12C describes a Grooved Cog Wheel 200, the same embodiment as of FIG. 11C.

FIG. 13A, FIG. 13B, FIG. 13C and FIG. 13D Describes some of the various embodiments of the Fork and Steerer Actuator Element interface. The described embodiments should be regarded as examples only and should not limit the scope of the claimed invention.

Figure 13A:
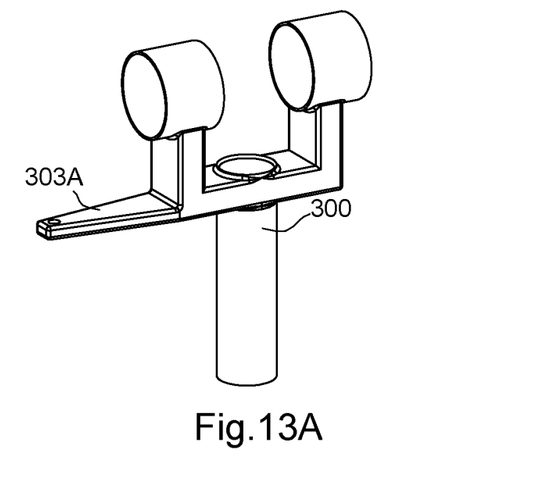
FIG. 13A, FIG. 13B, FIG. 13C and FIG. 13D describes further details of a Fork and Steerer Actuator Element interface, with different embodiments and variations, according to different embodiments of the present invention.

FIG. 13A describes a Steerer Actuator Element 303A as a lever that can transfer the action though a pushrod with rod end to an additional lever (as is also shown at FIG. 4A) or such a system. The Steerer Actuator Element 303A is a protruding element that is an integral part with the Fork 300, and they are fully connected.

Figure 13B:
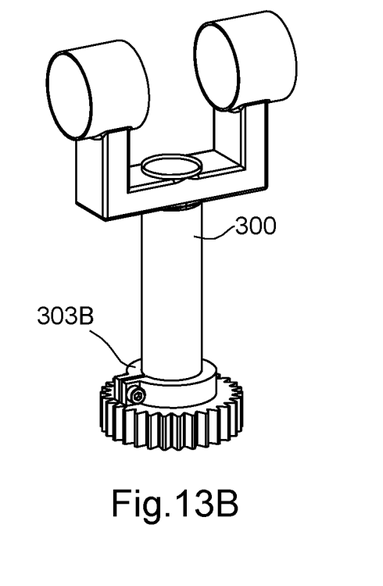
Figure 13C:
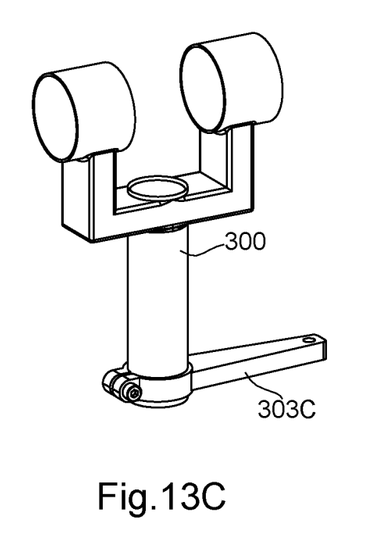

FIG. 13B describes a Steerer Actuator Element 303B as a cog wheel that can transfer the action to additional gear unit such as rack and pinion system or other cogs. At this example the Steerer Actuator Element 303B is connected to the Fork 300 with a fixing screw but there are other connection options.

FIG. 13C describes a Steerer Actuator Element 303C as a lever that can transfer the action though a pushrod with rod end to an additional lever (as is shown in FIG. 4B) or such a system. At this example the Steerer Actuator Element 303C is connected to the Fork 300 with a fixing screw but there are other connection options.

Figure 13D:
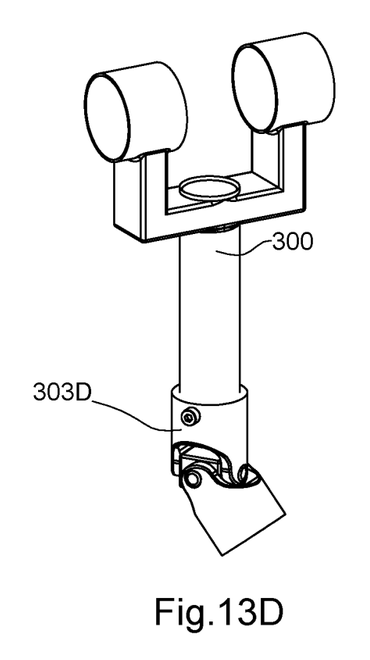

FIG. 13D describes a Steerer Actuator Element 303D as a universal joint element that can transfer the action though a shaft to additional steering or such a system. At this example the Steerer Actuator Element 303D is connected to the Fork 300 with a fixing screw but there are other connection options.

It will be apparent to one with skill in the art that the Steerable Crank System of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

The invention claimed is:

1. A Steerable Crank System comprising:
   a Steerer Base firmly connected to the chassis/mainframe of a vehicle;
   said Steerer Base containing and supporting Grooved Cog Wheel situated in a manner that allows said Grooved Cog Wheel to rotate and propel the vehicle;
   said Steerer Base containing and supporting a Fork in a manner that allows said Fork to rotate and by that rotation movement, controls the steering;
   said Fork containing and housing a Crank Shaft in a manner that allows said Crank Shaft to rotate;
   on said Crank Shaft attached a Butterfly Connector, said Butterfly Connector coupling together said Crank Shaft and Grooved Cog Wheel;
   on said Fork attached a Steerer Actuator Element;
   a steerer actuator element acting as leverage for steering, said Steerer Actuator Element accommodates various geometries and pluralities of element such as an off-center lever or cog wheel or gear system or universal joint to execute the steering mechanism of said machine.

2. The Steerable Crank System according to claim 1, whereas the implementation and incorporation of the system is within a Human Powered Vehicle with hand crank further comprising a two handles and arms mounted at said Crank Shaft extremities, said handles and arms grabbed by the rider and enable simultaneously propelling and steering said vehicle.

3. The Steerable Crank System according to claim 2 further comprising a Cog Wheel Bushings, said Cog Wheel Bushings may be ball bearings or bushings, it can be made of plastic inserts or phosphor bronze inserts or likewise low friction high strength materials, said Cog Wheel Bushings firmly connected to said Steerer Base, said Cog Wheel Bushings support said Grooved Cog Wheel and allow said Grooved Cog Wheel to rotate around its axis.

4. The Steerable Crank System according to claim 3 further comprising a Shaft Bearing, said Shaft Bearing positioned at extremities of said Fork $2^{nd}$ axis, said Shaft Bearing holds said Crank Shaft in place and allows it to rotate around its axis, said Shaft Bearing can be a standard BB bicycle bearing or likewise parts with left and right threads, said Shaft Bearing can contain a fixing element to prevent said Crank Shaft from moving along its axis.

5. The Steerable Crank System according to claim 4 further comprising a Headset Bearing, said Headset Bearing mounted on said Steerer Base, said Headset Bearing restrict said Fork to move only in a clockwise or anti-clockwise direction.

6. The Steerable Crank System according to claim 5 further comprising a mechanism of rod end and pushrod attached to said Steerer Actuator Element of a leverage type, said pushrod connected to a steering system of said Human Powered Vehicle to perform steering action.

7. The Steerable Crank System according to claim 5 further comprising a chain or belt or similar type of element connecting said Grooved Cog Wheel to said Human Powered Vehicle transmission system to perform driving action.

8. The Steerable Crank System according to claim 1, whereas said Crank Shaft, Butterfly Connector and Grooved Cog Wheel, and combinations thereof, has various embodiments, especially designed and adapted to specific applications, whereas said Butterfly Connector and Grooved Cog Wheel has various pluralities of 'Butterfly Wings' or Teeth or Splines, acting as a positive coupling of surfaces and bodies, between Crank Shaft and Cog Wheel, Range and number of said wings/teeth can vary from a minimum of 1 wing, to a typical use of 6-8 wings but is not limited to higher numbers of wings/teeth.

9. The Steerable Crank System according to claim 1, whereas said Crank Shaft, Butterfly Connector and Grooved Cog Wheel, and combinations thereof, has various embodiments, especially designed and adapted to specific applications, whereas Butterfly Wing/Tooth and Grooved Cog Wheel has various geometries acting as a positive coupling of surfaces and bodies, between Crank Shaft and Cog Wheel, Said geometry adapted per application to provide optimal power transfer, system reliability and stability, and system longevity and efficiency, Such Wing/Tooth geometries may be (but are not limited to) a Trapezoid geometry, a Spheroidal geometry, Cylindrical geometry, Conical geometry, or any other Wing/Tooth section geometry as may be advantageous in respect to load supporting, and minimal friction.

10. The Steerable Crank System according to claim 1, whereas said Crank Shaft has various possible geometries, allowing adaptation to specific applications, whereas Crank Shaft is similar in length or shorter in proportion to diameter, thus effectively functioning as a Shaft/Bushing, said Shaft/Bushing has identical function as said longer Crank Shaft, but can be assembled on a separate additional smaller diameter Crank Shaft, such that the said Shaft/Bushing can be connected to smaller diameter Crank Shaft by various means.

11. The Steerable Crank System according to claim 10, whereas said Shaft/Bushing allows the internal, smaller diameter Crank Shaft to move within the said Shaft/Bushing in an axial direction, thus effectively adding a $3^{rd}$ dimensional freedom of movement.

12. The Steerable Crank System according to claim 1, whereas said Crank Shaft, Butterfly Connector and Grooved Cog Wheel, and combinations thereof, has various embodiments, especially designed and adapted to specific applications, whereas the geometrical connection between Butterfly Connector and Cog Wheel is such, that it prevents the Butterfly Connector separating from the Grooved Cog Wheel by means of a spheroidal physical under-cut geometry, as for example is manifested in a ball-joint, thus both parts are permanently connected or substantially permanently connected and secured after assembly, thus also negating the need for several fixing parts such as shaft collars etc., while at the same time optimizing contact area between the active parts, said specific geometry of the Butterfly Connector may be directly applied onto said Crank Shaft, or said Shaft/Bushing by means of direct crimping, or similar additive, subtractive or formative production methods.

\* \* \* \* \*